United States Patent
Reilly et al.

(10) Patent No.: US 6,878,436 B2
(45) Date of Patent: Apr. 12, 2005

(54) LIGHT EMITTING DIODE SIGNS AND TRANSLUCENT PLASTIC SHEETS USED THEREIN

(75) Inventors: Jack J. Reilly, Blue Bell, PA (US); Paul J. Keating, Newportville, PA (US); Ryan R. Dirkx, Glenmore, PA (US)

(73) Assignee: Atofina, Puteaux (FR)

( * ) Notice: Subject to any disclaimer, the term of this patent is extended or adjusted under 35 U.S.C. 154(b) by 159 days.

(21) Appl. No.: 10/431,820

(22) Filed: May 8, 2003

(65) Prior Publication Data

US 2003/0218192 A1 Nov. 27, 2003

Related U.S. Application Data

(60) Provisional application No. 60/383,228, filed on May 23, 2002, and provisional application No. 60/438,611, filed on Jan. 8, 2003.

(51) Int. Cl.$^7$ .............................. B32B 5/00; H05B 33/00
(52) U.S. Cl. ...................... 428/221; 428/212; 428/332; 428/327; 428/690; 428/917; 313/506; 313/510
(58) Field of Search ................................ 428/690, 917, 428/221, 212, 332, 327; 313/506, 510

(56) References Cited

U.S. PATENT DOCUMENTS 5,705,580 A    1/1998  Giberti .................... 526/201

2002/0027626 A1    3/2002  Hiraishi et al.

FOREIGN PATENT DOCUMENTS

| EP | 0497506 A  | 8/1992  |            |
|----|------------|---------|------------|
| EP | 0683182 A2 | 5/1995  | C08F/20/12 |
| EP | 0774471 A1 | 11/1996 | C08F/20/12 |

*Primary Examiner*—Dawn Garrett
(74) *Attorney, Agent, or Firm*—Gilbert W. Rudman; Thomas F. Roland

(57) ABSTRACT

Disclosed is a polished translucent co-extruded sheet having utility as a light diffusing protective cover or sign face for light emitting diode (LED) light sources and other purposes. The sheet is comprised of (a) a particle layer containing particles having a mean particle size of about 4 to 100 microns and having a particle size distribution of between 1–110 microns, at a loading of 1 to 60% melt blended with a thermoplastic matrix, wherein the particle and matrix have refractive indices that differ by greater than 0.001 units of each other when measured in conformance with ASTM D 542; and (b) at least one substrate layer comprised of thermoplastic compositions, wherein the substrates have a refractive index within 0.2 units of the refractive index of the particle layer matrix when measured in conformance with ASTM D 542.

15 Claims, No Drawings

LIGHT EMITTING DIODE SIGNS AND TRANSLUCENT PLASTIC SHEETS USED THEREIN

REFERENCE TO RELATED APPLICATION

This application claims the benefit of U.S. Provisional Application Ser. No. 60/383,228, filed May 23, 2002 and Provisional Application Ser. No. 60/438,611, filed Jan. 8, 2003.

BACKGROUND OF THE INVENTION

1. Field of the Invention

This invention relates to a translucent, co-extruded thermoplastic sheet having use as a light diffusing protective cover or sign face for light emitting diode (LED) light sources and for other purposes and to LED signs using such sheets.

2. Prior Art

The most common plastics used as the face of illuminated signs and channel letters are acrylic and polycarbonate. Acrylics are typically used when high luminous transmission, excellent weatherability and/or resistance to yellowing is required. Polycarbonate is commonly used when high impact, heat or flammability resistance properties are required. In many of these applications the plastic is pigmented to achieve the desired color and transmission properties.

The most common light source used in illuminated channel letter applications has historically been luminous tubes. Luminous tubes are glass tubes filled with a gas which when subjected to high voltage (typically 3,000–15,000 Volts), becomes luminescent in a color that is characteristic of the gas used, of the gas and the color of the glass tubing combined, or of the fluorescent phosphors coating the inner wall of the glass tube. Neon gas emits a red color and argon gas mixed with mercury vapor emits a blue color, for example. These luminous tubes are typically 9 to 15 millimeters in diameter and are contoured to conform to the desired letter shapes.

A more recent trend in illuminating channel letters is to explore the possibility of switching from luminous tubes filled with a gas, particularly neon, to light emitting diode (LED) light sources. The reasons for sign makers to explore the use of LED light sources are as follows. LEDs have a longer expected lifetime (up to 100,000 hours), operate at low voltages (12 Volts DC), and reportedly offer greatly reduced operating costs. The reduced operating costs offered by LED light sources are attributable to the low voltage operating requirements, the highly directional luminous output and the very narrow wavelength range(i.e., a range of about 50 nanometers is possible) of the luminous output. These reduced operating costs not only benefit the end-users of the signs but the wide-spread use of LEDs may also help to significantly reduce energy consumption.

A comparison of the two light sources (luminous tubes and LEDs) reveals that they are very different. The luminous tubes may be very long and continuous in nature as contrasted with LEDs which are discontinuous and closer to representing point sources of light. Another difference is that the output from a luminous tube is typically emitted at all angles (0–360 degrees) radially from the tube whereas the LED output is highly directional and more wavelength specific.

When channel letter manufacturers have attempted to replace the luminous tubes with LED light sources, they have discovered that some of the plastic faces (particularly the lighter colors) do not hide the LED sources. They have also observed that the light is not distributed evenly across the face of the channel letter when using the LED light sources. In order to correct this problem, secondary operations such as applying a film to the light source side of the plastic face has been tried. This type of secondary operation may improve the ability of the face to hide the LED light sources but it also visibly changes the luminous transmission and transmitted color properties of the resultant plastic face when illuminated, and the reflected color when it is not illuminated. Additionally, this type of secondary operation is costly and creates yet another problem for sign makers, as described below.

Frequently there are multiple signs at one company location and many times there are multiple sign types. For instance, it is common to see a channel letter sign on a building advertising the name of the company and also a large stand-alone, street sign on a pole on the same property. It is often specified that the street sign face, in the area that advertises the company name, and the channel letter sign face, have the same optical properties (luminous transmission, transmitted and reflected color, and gloss). Hence, quite frequently the sign face material for each sign is the same. Therefore, when neither sign is illuminated, the reflected color and gloss properties of the sign faces are the same. Furthermore, when the signs are illuminated, the luminous transmission (i.e., brightness), and the transmitted colors of the sign faces are the same or similar. Note that the transmitted colors above may not be exactly the same when illuminated if there are differences in the color emission characteristics of the light sources (i.e., luminous tube versus fluorescent tube). Now if the sign maker changes from a luminous tube, light source to LEDs and applies a film on one side of the plastic sign face as previously described, the transmitted and reflected colors of the channel letter sign no longer match those of the street sign face. This poses yet another problem to the sign maker.

It is known that a secondary operation such as sand blasting one surface of the plastic sheet will cause sufficient surface roughness to hide an illuminated LED. However, this is a costly secondary processing step that leads to inherently high levels of product inconsistencies.

Standard acrylic sign face covers are commonly used in sign applications with luminous tube light sources. Examples of these include Plexiglas® MC (an extruded and melt calendered acrylic sheet comprised of a MMA/EA copolymer having a melt flow rate of about 2 g/10 minutes when measured in conformance with ASTM D 1238, Condition 230° C./3.8 kg, procedure A) sheet colors. It is also known that plastic sheet manufacturers may emboss a matte finish pattern onto the surface of the sheet during the extrusion process. The state-of-the-art method for producing plastic matte finish surfaces via a sheet extrusion process is to use an embossing roll to impart a matte finish pattern into the molten polymer extrudate as it is being polished and cooled into sheet. This is another technique that may be used to achieve the desired light scattering properties.

However, this embossing technology in the sheet extrusion process has several shortcomings:

1. The extrusion line needs to be shut down in order to change one of the polishing rolls from a typically used highly polished chrome roll used to produce standard products such as Plexiglas® MC sheet to a patterned roll typically used for a specialty product such as Plexiglas® MC Matte Finish sheet.

2. The degree of matte finish or gloss of the resultant Plexiglas® MC Matte Finish sheet changes dramatically for each sheet thickness produced. Typically with this embossing technology, a much higher gloss results on the thicker gauge sheet. This is because the thicker sheet retains the heat necessary to extrude or melt calendar the material for a much longer period of time. Consequently, after the sheet has been embossed with the pattern, the thicker gauge sheet tends to relax more and deviate more from the original embossed pattern. Hence, the amount of light scattering to hide an LED is not consistent with changes in sheet thicknesses.

The present invention enables an acrylic sheet to be economically produced using a co-extrusion process wherein:

1. The line does not need to be shut down to change from a highly polished sheet product to a specialty matte finish sheet product.
2. The gloss properties of the resultant sheet at various thicknesses are more consistent when compared with sheet produced using the embossing technology.

The present invention also enables a plastic sheet to be economically produced using the co-extrusion process wherein:

it effectively hides LED light sources and distributes the light, the sign maker may change the light source from a luminous tube to LEDs in channel letters without significantly changing the following properties:

the reflected color of the sign face exterior the gloss of the sign face exterior the transmitted color of the illuminated sign face the luminous transmission of the illuminated sign face.

This invention broadens the range of channel letter/sign face colors that may be used in applications illuminated with LEDs or other types of point light sources. It is only by the strategic positioning of these particles on the interior surface or as an interlayer of a sign face that these optical properties may be achieved.

SUMMARY OF THE INVENTION

The invention is a polished translucent co-extruded sheet, preferably 0.002 to 1.0 inches thick, having utility as a light diffusing protective cover or sign face for light emitting diode (LED) light sources and other purposes. The sheet is comprised of (a) a particle layer, preferably greater than 0.001 inches thick, more preferably 0.001 to 0.100 inches thick, containing particles having a mean particle size of about 4 to 100 microns, preferably 15 to 70 microns, and having a particle size distribution of between 1–110 microns, at a loading of 1 to 60% melt blended with a thermoplastic matrix, preferably an MMA/EA acrylic matrix, wherein the particle and matrix have refractive indices that differ by greater than 0.001 units of each other when measured in conformance with ASTM D 542; and (b) at least one substrate layer comprised of thermoplastic compositions, which are the same or different, wherein the substrates have a refractive index within 0.2 units of the refractive index of the particle layer matrix when measured in conformance with ASTM D 542.

The invention also relates to a light diffusing sign comprised of:

(a) a light emitting diode (LED) light source; and (b) a polished translucent co-extruded sheet comprised of
  (i) a particle layer, preferably 0.001 to 0.1 inches thick, containing particles having a mean particle size of about 4 to 100 microns, preferably 15 to 70 microns, a particle size distribution of between 1–110 microns, and a refraction index from 1.46 to 1.59, at a loading of 1 to 60%, preferably 10 to 50%, melt blended with a thermoplastic matrix, wherein the particles and matrix have refractive indices that differ by greater than 0.001 units, preferably 0.002 units, of each other when measured in conformance with ASTM D 542;
  (ii) at least one substrate layer comprised of a thermoplastic composition on the particle layer side facing away from the LED light source, wherein each substrate layer has a refractive index within 0.2 units of the refractive index of the particle layer matrix when measured in conformance with ASTM D 542; and
  (iii) optionally, at least one substrate layer on the particle layer side facing the LED light source, each substrate layer comprised of a thermoplastic composition, wherein each substrate layer has a refractive index within 0.2 units of the refractive index of the particle layer matrix when measured in conformance with ASTM D 542.

Still another embodiment is a translucent preferably, tri-layer, co-extruded sheet, comprised of:

(a) an interior particle layer containing particles having a mean particle size of about 4 to 100 microns, and having a particle size distribution of between 1–110 microns, at a loading of 1 to 60%, melt blended with a thermoplastic matrix, wherein the particle and matrix have refractive indices that differ by greater than 0.001 units when measured in conformance with ASTM D 542; and (b) at least two outer substrate layers comprised of thermoplastic compositions, wherein each substrate has a refractive index within 0.2 units of the refractive index of the particle layer matrix when measured in conformance with ASTM D 542.

DETAILED DESCRIPTION OF THE INVENTION

The particle layer of the present invention contains particles (beads) which have been melt blended with a thermoplastic matrix, preferably an acrylic matrix. The thickness of the particle layer is at least 0.001 inches thick, preferably 0.001 to 0.100 inches thick, and more preferably 0.002 to 0.030 inches thick.

The crosslinked particles may be made of a plastic material having an index of refraction ranging from 1.46 to 1.59. Preferably the crosslinked particles may be made by a suspension process. One preferred composition of the particles is comprised of 0–99.99% styrene, 0–99.99% alkyl methacrylate or alkyl acrylate, or a mixture of both, and 0.01–5% crosslinking agent. A more preferred typical composition is 0–99.9% styrene, 0–99.9% methyl methacrylate, 0–20%, preferably 1–5%, of (C1–C10) alkyl acrylates, such as methyl acrylate (MA) and ethyl acrylate (EA) and 0.1–2.5% crosslinking agent.

Crosslinking monomers suitable for use in the polymer particles (beads) are well known to those skilled in the art, and are generally monomers copolymerizable with monomers present, and having at least two or more unsaturated vinyl groups which have approximately equal or different reactivities, such as divinyl benzene, glycol di- and tri-methacrylate and acrylates, ethylene glycol dimethacrylate, allyl methacrylates, diallyl maleate, allyl acryloxypropionates, butylene glycol diacrylates, etc.

Preferred crosslinkers are ethylene glycol dimethacrylate, divinyl benzene, and allyl methacrylate. Most preferred is allyl methacrylate.

The particles, which preferably are spherical, have a mean particle size of about 4 to 100 microns, preferably 15–70 microns and most preferably 25–65 microns, and a particle size distribution of between 1–110 microns. The particle size may be controlled by agitation speed, reaction time, and level and type of suspending agents. The mean particle size is an average by weight or the percent by weight of each component based on the total weight of composition. The light scattering method used for particle size determination is ASTM D 4464.

The spherical particles may be made by a suspension process wherein the water is a continuous phase serving as a heat transfer medium and the polymerization is carried out in monomer droplets. In a suspension process, the viscosity change during polymer conversion is very small; therefore, the heat transfer is very efficient. The agitation speed, and composition and level of suspending agent are critical factors in determining the particle size distribution. The typical particle size from suspension is about 10–1000 microns. More detailed information about the suspension process can be found in U.S. Pat. No. 5,705,580, EP 0,683, 182-A2, and EP 0,774,471-A1.

The thermoplastic matrix used in the particle layer has a refractive index differing by greater than 0.001 units compared to the refractive index of the particles being used. Suitable thermoplastics include polycarbonate (PC), polyethylene terephthalate—glycol modified (PETG), polyvinyl chloride (PVC), impact modified PVC, polyesters (PET, PBT, APET, etc.), styrene acrylonitrile (SAN), acrylonitrile-acrylate copolymer, acrylonitrile-methyl methacrylate copolymer, methyl methacrylate-styrene copolymer, methacrylate-butadiene-styrene terpolymer, acrylonitrile-styrene-acrylate (ASA) terpolymer, acrylonitrile butadiene styrene (ABS) terpolymer, polystyrene (PS), high impact polystyrene (HIPS), polyolefins, impact modified polyolefins, polycyclo-hexylethylene, cyclic olefin copolymer (COC), polyvinylidene fluoride (PVdF), PVdF-acrylic copolymers, imidized acrylic polymer, acrylic polymers, impact modified acrylic polymers, etc., or mixtures thereof.

The term "acrylic polymer(s)" as used herein means:
1. alkyl methacrylate homo polymers,
2. copolymers of alkyl methacrylates with other alkyl methacrylates or alkyl acrylates or other ethylenically unsaturated monomers,
3. alkyl acrylate homo polymers, and
4. copolymers of alkyl acrylates with other alkyl acrylates or alkyl methacrylates or other ethylenically unsaturated monomers.

The alkyl group can be from 1–18 carbon atoms, preferably 1–4 carbon atoms. Preferred are polymethyl methacrylate based matrix and copolymers of methyl methacrylate with from about 0.1%–40% alkyl acrylates, wherein the alkyl contains 1–4 carbon atoms, alkyl acrylic acids wherein alkyl contains 1–18 carbon atoms.

Preferably the thermoplastic matrix material is acrylic and comprises a polymer or copolymer of methyl methacrylate (MMA); typical copolymers include 60–99% MMA and 1–40%, preferably 1–25%, of (C1–C10) alkyl acrylates, such as methyl acrylate (MA) and ethyl acrylate (EA). Suitable commercially available poly (methyl methacrylate) type thermoplastic matrix materials include is Plexiglas® V(825), V(825) HID, V(046), V(045), V(052), V(920), etc.

More preferably, the matrix is 90–98% MMA and 2–10% EA, most preferred, is about 95–97% MMA and about 3–5% EA.

The polymer matrix is conveniently prepared by conventional cell casting or melt extrusion processes and is typically provided in particulate form. In addition, thermoplastic matrix materials may be prepared by a conventional bulk process (for example, a continuous flow stirred tank reactor (CFSTR process), solution, suspension or emulsion polymerization techniques, in which case conventional isolation processes used to recover the polymer in particulate form include, for example, filtration, coagulation and spray drying.

The matrix may also include other modifiers or additives which are well known in the art. For example, the composition may contain colorants, impact modifiers, external lubricants, antioxidants, flame retardants or the like. If desired, ultraviolet stabilizers, thermal stabilizers, flow aids, and anti-static agents may also be added.

The preferred materials used to produce the bead and matrix have a refractive index of 1.46–1.59, when measured in conformance with ASTM D 542. However, in order to achieve the desired high haze or hiding power characteristics, the bead and matrix in the plastic sheet of the present invention must have refractive indices differing by greater than 0.001 units of each other, preferably differing by greater than 0.002 units, when measured in conformance with ASTM D 542.

The particle layer may be produced by melt blending the particles, at a loading of 1 to 60%, preferably 10 to 50%, with the thermoplastic matrix.

While melt blending is well known in the industry, one example of the process for producing an article of the present invention is as follows: The thermoplastic matrix resin is dried in a dehumidifying, forced hot air oven before being compounded with the crosslinked particles through, for example, a single-screw extruder equipped with a 2-stage, medium work screw and a vacuum venting system. A twin screw extruder equipped with a vacuum venting system may also be used for the compounding. The particles, the matrix resin, and additives are added into the feed hopper of the extruder using separate feeders. The conveyer system for the beads should be a closed system to avoid safety and dust hazards. The particles are metered into the feed hopper of the extruder using a feeder equipped with an auger screw by gravimetric control or by volumetric feeding control. The temperature profile which can be used for making the particle layer resin when the composition contains 1–60% suspension beads and 40–99% thermoplastic, preferably acrylic made by a free radical polymerization process, can be as follows:

Typical process conditions for a single screw, compounding extruder are listed below:

| Extruder Conditions | Conditions |
| --- | --- |
| Barrel Zone 1: | 225–240° C. |
| Barrel Zone 2: | 235–255° C. |
| Barrel Zone 3: | 245–260° C. |
| Screw Speed: | 60–100 RPM (revolutions per minute) |

The continuously-produced extrudate is cooled by running the strand through a water bath and subsequently cutting it into particle layer resin pellets. This particle layer resin is oven dried before further usage.

The inventors have found that the particle size and particle loading level in the particle layer both influence the degree of surface roughness. Typically, the higher the surface roughness, the lower the degree of gloss or specular reflection. However, light scattering may also occur due to refractive index mismatches between the particles and the particle layer matrix material. This light scattering typically increases the haze of the sheet. Even when the refractive index of the particles is only slightly mismatched compared to that of the matrix, there is some contribution to haze due to very minor mismatches in the refractive indices between the crosslinked particles and the thermoplastic matrix material. This is why the particle layer thickness is important to control, particularly for colorless and transparent substrate colors, so that the optical properties (high transmission, gloss and color) are optimized for LED illuminated applications.

The implications of the above statements to a 2-layer sheet are as follows: If the particle size and particle layer thickness are fixed, then a higher loading level of particles with a refractive index that is only slightly mismatched to the matrix of the particle layer are needed to achieve the same haze or degree of hiding compared to using particles that are more mismatched in refractive index compared to the particle layer matrix. In the case of the slightly mismatched refractive indices above, the haze or hiding power is primarily attributable to the resultant surface roughness created by the presence of these particles. In the case of the highly mismatched refractive indices above, the haze is attributable to both the resultant surface roughness and this refractive index mismatch. Hence, the surface roughness should be the same for the above 2 cases if everything else is equivalent except for the refractive indices of the particles. Therefore, since the particles that are more mismatched in refractive index from the particle layer matrix create additional haze or hiding power, a lower loading level of these particles is needed to produce the same haze or hiding power as another sample made using particles that are more closely matched in refractive index.

Following the above logic for a multi-layer sheet wherein the particle layer is not located on either surface (i.e., particle layer is an interlayer) and high gloss substrate layers are located on both surfaces, a higher loading of particles or a thicker layer may be needed to achieve the same hiding power or haze. The hiding power or haze is primarily attributable to the refractive index mismatch between the particles and the matrix since the surface roughness contributions are minimized due to the high gloss surfaces.

The substrate layers are comprised of the same type of thermoplastic material as described for the particle layer matrix; however the substrates do not have to be the same as each other. The composition used in the substrate layers can be the same or different as the composition of the particle layer matrix so long as the refractive index of the compositions are within 0.2 units, but preferably within 0.1 units, of the particle layer matrix.

A preferred embodiment of the present invention is a multi-layer sheet structure wherein the particle layer is not on either surface (for example, a 3-layer structure with the particle layer in the middle, or offset from the middle to the extent that it is not in contact with either surface).

One of the advantages of a three-layer or a more complex multi-layer structure with non-particle layer surfaces is that the sheet may be positioned with either surface facing the light source such as an LED. In the 2-layer construction, it is preferred that textured side faces the LED light source and the exterior surface is a glossy surface that matches the appearance of other sign surfaces. By incorporating the particle layer within the sheet anywhere but on either surface, the light diffusion characteristics and high gloss on both surfaces may still be achieved. Hence, the sign may be assembled without regard for which surface faces the LED light source. Another advantage is that the high gloss surfaces of the sheet are easier to clean compared to the textured surface on a 2-layer structure. This hidden advantage may produce reduced dirt build-up on the interior surface of the sign to enable longer-term, high output performance and reduced maintenance costs.

The use of a particulate layer in the multi-layer sheet of the present invention offers additional benefits such as (a) enabling the use of less pigments in the optionally colored layer(s) resulting in higher transmission and lower costs to get the same hiding power, (b) allowing reduced sheet thickness to get the same hiding power, while having reduced thickness sheet be of reduced weight and cost with higher transmission and (c) achieving higher light transmission resulting in either signs which are brighter or signs with similar brightness but lower power consumption. These benefits are not only provided when the sheets are used with LED light sources but also when the sheets are used with more traditional light sources.

The co-extruded product may be produced by a co-extrusion process comprised of two or more extruders converting plastic resin materials into molten plastic. Typically, there is a minimum of a primary extruder and a secondary extruder, but there may also be additional extruders, such as a tertiary extruder, etc. The primary extruder is usually the largest extruder and has the highest throughput rate compared to the other individual extruder(s). Therefore, for example, in a 2-layer sheet configuration, the resin used to comprise the substrate layer is typically fed into the primary extruder and the particle layer resin used to comprise the particle layer is typically fed into the secondary extruder when using a co-extrusion set-up consisting of 2 extruders. Each of these extruders converts the resins fed to them into molten polymer, separately. The melt streams are then combined typically in a feedblock system or in a multi-manifold die set-up. In the feedblock system, there is a plug that is installed that determines how these 2 molten plastics will be layered in the final sheet. Hence, the polymer melt streams enter into the feedblock separately and are selectively combined within the feedblock. For a 2-layer sheet configuration, the particle layer may be located on either the top or bottom side of the substrate layer. For a 3-layer sheet configuration, the particle layer may be located anywhere but on the exterior surface (i.e., an interlayer or on the surface facing the light source). Once the plastic melt streams are selectively layered and co-mingled in the feedblock, the combined melt stream exits the feedblock and enters the die where the combined melt stream is spread to the width of the die. The molten plastic extrudate is then polished between highly polished chrome-plated, temperature-controlled rolls. These rolls polish and cool the sheet to the desired overall thickness. Note that a multi-manifold die may also be used to achieve a layered sheet instead of a feedblock system. The polymer melt streams enter into the multi-manifold die separately and are selectively combined and spread to the width of the die all within the multi-manifold die.

Typical process conditions for 2 or 3-layer, sheet co-extrusion using a primary and secondary extruders and a feedblock/die assembly are listed below:

| Primary Extruder | Conditions |
| --- | --- |
| Barrel Zones: | 199–275° C. |
| Screw Speed: | 30–85 RPM (revolutions per minute) |
| Secondary Extruder | Conditions |
| Barrel Zones: | 221–280° C. |
| Screw Speed: | 5–50 RPM (revolutions per minute) |
| Feedblock | Temperature |

| Zones Die | 220–260° C. Temperature |
|---|---|
| Zones Polishing Rolls | 220–290° C. Temperature |
| All | 80–120° C. |

The overall sheet thickness of the present invention will preferably be 0.002 to 1.0 inches thick, more preferably 0.04 to 0.5 inches thick.

The multi-layer plastic sheet of the present invention when colorless will have the following characteristics:

(a) luminous transmission of greater than 70%, preferably greater than 80%, more preferably greater than 90%, when measuring spectral transmission data using a spectrophotometer (such as Macbeth® Color-Eye® 7000 spectrophotometer—Division of Kollmorgen Instruments Corporation, Illuminant C, and the 2° observer), and calculating the CIE tristimulus Y value in conformance with ASTM E 308, which is a measure of the amount of light transmitted through the sheet;

(b) haze of greater than 30% when measured in conformance with ASTM D 1003, which is a measurement of light scattering or optical clarity;

(c) a 85° gloss value measured on the particle layer surface of two different sheet thicknesses within the range of 0.002 to 1.0 inches thick, preferably on a 0.118 inch thick sample sheet and 0.236 inch thick sample sheet, which are within 15 units, preferably within 10 units, and more preferably within 5 units of each other, when measured for example, by using a micro-TRI-gloss meter made by BYK-Gardner GmbH, in conformance with ASTM D 523 using a black felt backing, which is a measure of specular reflection, i.e., the consistency of optical properties at various thicknesses.

Uses for these compositions are in LED-illuminated sign face applications, protective sign covers (particularly backlit signs), light covers, etc. where good optical quality properties are desired. Additionally, since these co-extruded compositions retain their matte finish surface characteristics better than prior art materials after heat bending, uses for these compositions may extend into heat-bent and thermoforming applications.

It is also within the inventive concept hereof, that if the gloss of the surface of the translucent sheet facing away from the LEDs is not critical, but only a sheet that has the other characteristics of the sheet of the present invention, i.e., gloss consistency, color, etc. that objective could be achieved by co-extruding sheet with 2 or more layers (i.e., particle layer on exterior surface over substrate layer or both surfaces over substrate layer).

The present invention will now be exemplified in more detail by referencing the following, non-limiting examples.

EXAMPLE 1

A Two Layered Sheet

Preparation of a particle layer (composition x). Crosslinked particles comprised of a 96% methyl methacrylate/4% ethyl acrylate copolymer with allyl methacrylate used as the crosslinking agent, that are substantially spherical, having a mean particle diameter of about 10 to 32 microns, wherein 90% of the particles by weight are less than 40 microns in diameter, and a refractive index ($n_D$) of 1.4907 were melt blended into an acrylic molding resin (methyl methacrylate/ethyl acrylate 96/4) at 40% by weight. The refractive index ($n_D$) of the acrylic molding resin used above was measured as 1.4935 in conformance with ASTM D 542. Hence the refractive index of the particle differs by more than 0.002 units compared to that of the acrylic matrix.

Preparation of a particle layer (composition y). Crosslinked particles comprised of a 74.3% methyl methacrylate, 24.8% styrene, and 0.9% allyl methacrylate used as the crosslinking agent, that are substantially spherical, having a mean particle diameter of about 50 to 60 microns, and have a particle size distribution of between 1–110 microns in diameter, and a refractive index ($n_D$) of 1.5217 were melt blended into an acrylic molding resin (methyl methacrylate/ethyl acrylate 96/4) at 40% by weight. The refractive index ($n_D$) of the acrylic molding resin used above was measured as 1.4935 in conformance with ASTM D 542. Hence the refractive index of the particle differs by more than 0.02 units compared to that of the acrylic matrix.

Preparation of a clear substrate layer and co-extruded sheet. The above described particle layer resin was fed into a secondary extruder. The same colorless acrylic resin that was used as the matrix of the particle layer resin (methyl methacrylate/ethyl acrylate 96/4) was fed separately into the primary extruder to make the colorless sheet versions. The red colored samples were produced using the same colorless particle layer resin as described above. However, a red pigment was introduced into the primary extruder along with the above mentioned acrylic resin composition to achieve the desired color.

A co-extrusion setup was used whereby the melt streams from each of these extruders was fed to a feedblock/die assembly where the melts were layered and spread to the width of the die. The layered extrudate was subsequently polished between a series of polishing rolls to yield 0.118 inch thick sheet with a smooth, glossy finish on 1 side and a matte finish surface on the other side. Particle layer thicknesses in the range of 0.002 to 0.030 inches seemed to yield the best balance of properties.

Measurement of Properties. Transmission and reflection spectra were measured using a Macbeth® Color-Eye® 7000 spectrophotometer (Division of Kollmorgen Instruments Corporation) with the specular and UV components included, the zoom lens in the large area view (LAV) position, and with the LAV aperture installed. The equipment was calibrated in transmission mode using a barium sulfate standard and in reflection mode using a white ceramic tile. The spectra were obtained using Illuminant C and a 2° observer. CIE tristimulus X, Y, Z, L*, a*, and b* values were calculated in conformance with ASTM E 308. The CIE tristimulus Y value was used as a measure of luminous transmission. Haze properties were measured in conformance with ASTM D 1003. Specular gloss properties were measured at angles of 20°, 60°, and 85° using a micro-TRI-gloss meter made by BYK-Gardner GmbH in conformance with ASTM D 523 using a black felt backing. The gloss meter was calibrated using a black glass standard and readings of 92.6, 95.5 and 99.5 were obtained at angles of 20°, 60° and 85°, respectively.

A summary of optical properties for various samples produced by the above methods are shown at the top of Table I.

The commercial materials listed in Table I are sold by ATOGLAS division of ATOFINA Chemicals, Inc. Plexiglas® MC (highly polished) and Plexiglas® MC Matte Finish (embossed) acrylic sheet have the same MMA/EA composition as described under prior art. The primary difference is that Plexiglas MC has very smooth and glossy surfaces whereas, the Plexiglas Matte Finish sheet has one smooth and glossy surface and one embossed, low gloss surface.

One feature of the present invention is that more consistent optical properties are obtainable at various thicknesses. For example, the 85° gloss of Plexiglas® Matte Finish is 5.3 for 0.118 inch thick sheet and 35.3 for 0.236 inch thick sheet, while for the samples with 40% beads in the particle or, in this case, cap layer, the 85° gloss is 2.9 for 0.118 inch thick sheet and 2.7 for 0.236 inch thick sheet.) This feature was also confirmed visually. In Ex 1a–e, the particle layer was a 0.007" thick layer of composition y and substrate layer was as prepared above, the examples differ by the total thickness of the sheet.

TABLE I

Optical Properties of Colorless Sheets*

| Sheet Material | Thickness (inches) | Transmission(%) | Haze (%) | Gloss 20° | Gloss 60° | Gloss 85° |
|---|---|---|---|---|---|---|
| Ex 1a | 0.118 | 91.3 | >30 | 1.2 | 11.5 | 2.9 |
| Ex 1b | 0.177 | 92.1 | >30 | 0.7 | 11.1 | 2.5 |
| Ex 1c | 0.236 | 91.5 | >30 | 0.7 | 14.7 | 2.7 |
| Ex 1d | 0.354 | 89.4 | >30 | 0.8 | 16.7 | 4.4 |
| Ex 1e | 0.472 | 87.5 | >30 | 0.9 | 19.8 | 5.3 |
| Plexiglas® MC | 0.118 | 92.1 | 0.8 | 134.3 | 127.1 | 106.9 |
| Plexiglas® Matte Finish | 0.118 | 91.4 | >30 | 0.6 | 6.3 | 5.3 |
| Plexiglas® Matte Finish | 0.177 | | >30 | 1.4 | 7.9 | 12.4 |
| Plexiglas® Matte Finish | 0.236 | | >30 | 4.2 | 14.8 | 35.3 |

*Gloss values were measured on textured surface side.

Table IIA shows that the standard red acrylic sample and the co-extruded red sample both have about the same transmission and transmitted color values. This table also shows that the textured surface of the co-extruded sample has much lower gloss and about the same reflected color values compared to the standard acrylic sample.

Ex 2a contained a pigment in the substrate layer and had a 40% loading of particles in the particle layer which was 0.007 inches thick and comprised of composition y.

TABLE IIA

Transmission Properties of Red-Colored Sheets*

| Sheet Material | Thickness (inches) | Transmission (%) | Transmitted Color L* | a* | b* |
|---|---|---|---|---|---|
| Ex 2a | 0.118 | 4.2 | 24.3 | 51.3 | 37.1 |
| Plexiglas® MC 3153 Red | 0.118 | 4.4 | 24.9 | 51.9 | 37.9 |

TABLE IIB

Reflection Properties of Red-Colored Sheets*

| Sheet Material | Thickness (inches) | Gloss 20° | Gloss 60° | Gloss 85° | Reflected Color L* | a* | b* |
|---|---|---|---|---|---|---|---|
| Ex 2a | 0.118 | 0.2 | 1.2 | 0.8 | 42.1 | 44.5 | 27.4 |
| Plexiglas® MC 3153 Red | 0.118 | 78.9 | 88.6 | 96.6 | 41.9 | 44.4 | 26.9 |

*Gloss and reflected color values were measured on textured surface side.

Table IIIA shows that the standard red acrylic sample and the co-extruded red sample both have about the same transmission and transmitted color values. Table IIIB shows that the smooth surface of the co-extruded sample has about the same gloss and reflected color values compared to the standard acrylic sample.

TABLE IIIA

Transmission Properties of Red-Colored Sheets**

| Sheet Material | Thickness (inches) | Transmission (%) | Transmitted Color L* | a* | b* |
|---|---|---|---|---|---|
| Ex 2a | 0.118 | 4.2 | 24.3 | 51.6 | 37.4 |
| Plexiglas® MC 3153 Red | 0.118 | 4.4 | 24.9 | 51.9 | 37.8 |

TABLE IIIB

Reflection Properties of Red-Colored Sheets**

| Sheet Material | Thickness (inches) | Gloss 20° | Gloss 60° | Gloss 85° | Reflected Color L* | a* | b* |
|---|---|---|---|---|---|---|---|
| Ex 2a | 0.118 | 79.4 | 85.7 | 97.1 | 41.7 | 44.7 | 27.0 |
| Plexiglas® MC 3153 Red | 0.118 | 79.2 | 87.4 | 96.2 | 41.9 | 44.5 | 27.0 |

**Gloss and reflected color values were measured on smooth surface side.

A comparison of the Plexiglas® MC 3153 red sample with the co-extruded sample is shown in Table IV in terms of LED visibility. A red AlInGaP (aluminum indium gallium phosphide) LED operating at 12 Volts and 50 milliamps was used for this test. The test sample was positioned at a distance of 4 inches away from the LED light source. In the case of the co-extruded sample, the textured surface was facing the LED. The sample surface facing away from the LED source was then viewed in an effort to see the LED through the sample. When viewing our standard MC red sample, a 'halo' effect from the LED was visible. This is very similar to filament hiding power or image obscuration when viewing older point light sources. However, the co-extruded sample completely obscured this 'halo' image of the LED.

TABLE IV

LED Visibility of Red-Colored Sheets***

| Sheet Material | Thickness (inches) | Transmission (%) | LED Visible? |
|---|---|---|---|
| Ex 2a | 0.118 | 4.2 | No |
| Plexiglas® MC 3153 Red | 0.118 | 4.4 | Yes |

***Transmission and LED visibility tests conducted with textured surface facing towards light source.

EXAMPLE 2

Multi-Layer Sheet Products

The following are examples of materials made using three layer, co-extrusion technology. Two extruders are used (A=Primary extruder and B=Secondary extruder). The resin extruded through the primary extruder is used to construct the 'A' layers and the resin extruded through the secondary extruder is used to construct the 'B' layer. Sheet samples are produced with an 'ABA' layering construction. In Example 3a, the standard red acrylic resin is fed through both extruders to produce a control sheet for these experiments.

Table V-A shows that the standard red acrylic sample (Ex 3a) and the co-extruded red samples (Ex 3b–f) have about the same transmission and transmitted color values. Table V-B shows that the top surfaces of the co-extruded samples have about the same gloss and reflected color values compared to the top surface of the standard acrylic sample.

Ex 3a–f contained a pigment in the substrate layers and had a 40% loading of particles comprised of composition y in the particle interlayer which was varied in thickness.

TABLE V-A

Transmission Properties of Red-Colored Sheets*

| Sheet Material | Interlayer Thickness (inches) | Transmission (%) | Transmitted Color | | |
|---|---|---|---|---|---|
| | | | L* | a* | b* |
| Ex 3a | 0.000 | 4.6 | 25.6 | 51.3 | 37.2 |
| Ex 3b | 0.003 | 4.9 | 26.6 | 50.8 | 36.7 |
| Ex 3c | 0.004 | 5.0 | 26.8 | 50.6 | 36.4 |
| Ex 3d | 0.006 | 5.2 | 27.2 | 50.3 | 35.9 |
| Ex 3e | 0.008 | 5.4 | 27.8 | 50.2 | 35.7 |
| Ex 3f | 0.011 | 5.3 | 27.5 | 50.2 | 35.9 |

TABLE V-B

Reflection Properties of Red-Colored Sheets*

| Sheet Material | Interlayer Thickness (inches) | Gloss | | | Reflected Color | | |
|---|---|---|---|---|---|---|---|
| | | 20° | 60° | 85° | L* | a* | b* |
| Ex 3a | 0.000 | 79.2 | 87.0 | 91.0 | 41.9 | 44.5 | 26.9 |
| Ex 3b | 0.003 | 79.0 | 87.0 | 91.7 | 41.7 | 44.0 | 26.5 |
| Ex 3c | 0.004 | 79.1 | 87.5 | 91.6 | 41.7 | 43.8 | 26.4 |
| Ex 3d | 0.006 | 78.0 | 86.8 | 92.1 | 41.6 | 43.6 | 26.4 |
| Ex 3e | 0.008 | 79.4 | 87.8 | 92.4 | 41.5 | 43.5 | 26.3 |
| Ex 3f | 0.011 | 77.9 | 86.9 | 91.7 | 41.6 | 43.4 | 26.2 |

*Transmission and transmittd color values were measured with the top surface facing towards the light source. Gloss and reflected color values were measured on the top surface side. All samples were 0.118 thick.

Table VI-A shows that the standard red acrylic sample (Ex 3a) and the co-extruded red samples (Ex 3b–f) both have about the same transmission and transmitted color values. Table VI-B shows that the bottom surfaces of the co-extruded samples (Ex 3b–f) have about the same gloss and reflected color values compared to the bottom surface of the standard acrylic sample (Ex 3a).

TABLE VI-A

Transmission Properties of Red-Colored Sheets**

| Sheet Material | Interlayer Thickness (inches) | Transmission (%) | Transmitted Color | | |
|---|---|---|---|---|---|
| | | | L | a | b |
| Ex 3a | 0.000 | 4.5 | 25.4 | 51.0 | 37.0 |
| Ex 3b | 0.003 | 4.9 | 26.5 | 50.7 | 36.7 |
| Ex 3c | 0.004 | 5.0 | 26.8 | 50.6 | 36.4 |
| Ex 3d | 0.006 | 5.3 | 27.5 | 50.4 | 36.0 |
| Ex 3e | 0.008 | 5.3 | 27.7 | 50.3 | 35.8 |
| Ex 3f | 0.011 | 5.3 | 27.4 | 50.2 | 35.9 |

TABLE VI-B

Reflection Properties of Red-Colored Sheets**

| Sheet Material | Interlayer Thickness (inches) | Gloss | | | Reflected Color | | |
|---|---|---|---|---|---|---|---|
| | | 20° | 60° | 85° | L | a | b |
| Ex 3a | 0.000 | 78.7 | 85.8 | 99.3 | 41.8 | 44.4 | 26.7 |
| Ex 3b | 0.003 | 78.3 | 85.7 | 98.3 | 41.7 | 43.9 | 26.4 |
| Ex 3c | 0.004 | 79.5 | 86.4 | 98.5 | 41.6 | 43.8 | 26.4 |
| Ex 3d | 0.006 | 78.9 | 86.0 | 98.1 | 41.5 | 43.6 | 26.3 |
| Ex 3e | 0.008 | 78.3 | 85.9 | 98.6 | 41.5 | 43.4 | 26.2 |
| Ex 3f | 0.011 | 78.7 | 85.6 | 98.1 | 41.5 | 43.4 | 26.2 |

**Transmission and transmitted color values were measured with the bottom surface facing towards the light source. Gloss and reflected color values were measured on the bottom surface side. All samples were 0.118 inches thick.

A comparison of the standard red acrylic sample (Ex 3a) with the co-extruded samples (Ex 3b–f) is shown in Table VII in terms of LED visibility. A red AlInGaP (aluminum indium gallium phosphide) LED operating at 12 Volts and 50 milliamps is used for this test. The test sample is positioned at a distance of 4 inches away from the LED light source. The sample surface facing away from the LED source is then viewed in an effort to see the LED through the sample. When viewing the standard red acrylic sample, a 'halo' effect from the LED is visible. This is very similar to filament hiding power or image obscuration when viewing older point light sources. However, the co-extruded samples completely obscured this 'halo' image of the LED.

TABLE VII

LED Visibility of Red-Colored Sheets***

| Sheet Material | Interlayer Thickness (inches) | Transmission (%) | LED Visible? |
|---|---|---|---|
| Ex 3a | 0.000 | 4.5 | Yes |
| Ex 3b | 0.003 | 4.9 | No |
| Ex 3c | 0.004 | 5.0 | No |
| Ex 3d | 0.006 | 5.3 | No |
| Ex 3e | 0.008 | 5.3 | No |
| Ex 3f | 0.011 | 5.3 | No |

***Transmission and LED visibility tests conducted with the bottom surface facing towards the light source. All samples were 0.118 inches thick.

The present invention may be embodied in other specific forms without departing from the spirit or essential attributes thereof.

What is claimed is:

1. A light diffusing sign comprised of
   (a) a light emitting diode (LED) light source; and
   (b) a polished translucent co-extruded sheet comprised of
      (i) a particle layer containing particles having a mean particle size of about 4 to 100 microns and having a particle size distribution of between 1–110 microns, at a loading of 1 to 60% melt blended with a thermoplastic matrix, wherein the particle and matrix have refractive indices that differ by greater than 0.001 units of each other when measured in conformance with ASTM D 542; and
      (ii) at least one substrate layer comprised of a thermoplastic composition, wherein each substrate layer has a refractive index within 0.2 units of the refractive index of the particle layer matrix when measured in conformance with ASTM D 542.

2. A light diffusing sign comprised of
(a) a light emitting diode (LED) light source; and
(b) a polished translucent co-extruded sheet comprised of
  (i) a particle layer, containing particles having a mean particle size of about 4 to 100 microns and having a particle size distribution of between 1–110 microns, at a loading of 1 to 60% melt blended with a thermoplastic matrix, wherein the particles and matrix have refractive indices that differ by greater than 0.001 units of each other when measured in conformance with ASTM D 542;
  (ii) at least one substrate layer comprised of a thermoplastic composition on the particle layer side facing away from the LED light source, wherein each substrate has a refractive index within 0.2 units of the refractive index of the particle layer matrix when measured in conformance with ASTM D 542.
  (iii) optionally, at least one substrate layer on the particle side facing the LED light source, each substrate layer comprised of a thermoplastic composition, wherein each substrate has a refractive index within 0.2 units of the refractive index of the particle layer matrix when measured in conformance with ASTM D 542.

3. A light diffusing sign comprised of
(a) a light emitting diode (LED) light source; and
(b) a polished translucent co-extruded sheet, 0.002 to 1.0 inches thick, comprised of
  (i) a particle layer, 0.001 to 0.1 inches thick, containing particles having a mean particle size of about 15 to 70 microns and having a particle size distribution of between 1–110 microns, and a refraction index from 1.46 to 1.59, at a loading of 10 to 50% melt blended with a thermoplastic matrix, wherein the particles and matrix have refractive indices that differ by greater than 0.002 units of each other when measured in conformance with ASTM D 542;
  (ii) at least one substrate layer comprised of a thermoplastic composition on the particle layer side facing away from the LED light source, wherein each substrate layer has a refractive index within 0.2 units of the refractive index of the particle layer matrix when measured in conformance with ASTM D 542; and
  (iii) optionally, at least one substrate layer on the particle layer side facing the LED light source, each substrate layer comprised of a thermoplastic composition, wherein each substrate layer has a refractive index within 0.2 units of the refractive index of the particle layer matrix when measured in conformance with ASTM D 542.

4. The sign of claim 1, wherein the sheet is colored.

5. The sign of claim 1 wherein the sheet is non-colored.

6. The sign of claim 1, wherein the composition of the particles of the particle layer is 0–99.99% styrene, 0–99.99% alkyl methacrylate or alkyl acrylate, or a mixture of both, and 0.01–5% crosslinking agent and the particles have an index of refraction ranging from 1.46 to 1.59.

7. The sign of claim 6, wherein, the matrix of the particle layer is 90–98% MMA and 2–10% EA.

8. The sign of claim 7 wherein the optional layers are each comprised of 90–98% MMA and 2–10% EA.

9. A translucent co-extruded sheet, comprised of:
(a) an interior particle layer containing particles having a mean particle size of about 4 to 100 microns, and having a particle size distribution of between 1–110 microns, at a loading of 1 to 60%, melt blended with a thermoplastic matrix, wherein the particles and matrix have refractive indices that differ by greater than 0.001 units when measured in conformance with ASTM D 542; and
(b) at least two outer substrate layers comprised of thermoplastic compositions, wherein each substrate layer has a refractive index within 0.2 units of the refractive index of the particle layer matrix when measured in conformance with ASTM D 542.

10. The sheet of claim 9, wherein the sheet is colored.

11. The sheet of claim 9 wherein the sheet is 0.002 to 1.0 inches thick.

12. The sheet of claim 9, wherein the composition of the particles of the particle layer is 0–99.99% styrene, 0–99.99% alkyl methacrylate or alkyl acrylate, or a mixture of both, and 0.01–5% crosslinking agent and the particles have an index of refraction ranging from 1.46 to 1.59.

13. The sheet of claim 12, wherein, the matrix of the particle layer is 90–98% MMA and 2–10% EA.

14. The sheet of claim 9 wherein the outer layers are each comprised of 90–98% MMA and 2–10% EA.

15. The sheet of claim 9 which is tri-layered.

* * * * *